(12) United States Patent
Mizutani et al.

(10) Patent No.: US 10,018,473 B2
(45) Date of Patent: Jul. 10, 2018

(54) VEHICLE POSITION DETECTING DEVICE

(71) Applicants: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

(72) Inventors: Yuichi Mizutani, Chita-gun (JP); Shogi Fukukawa, Nagoya (JP); Takatomo Asai, Nagoya (JP); Hiroyuki Tachibana, Okazaki (JP); Hironobu Ishijima, Toyota (JP); Kiyoshi Takahashi, Hekinan (JP)

(73) Assignees: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 0 days.

(21) Appl. No.: 15/509,713

(22) PCT Filed: Sep. 10, 2015

(86) PCT No.: PCT/JP2015/075695
§ 371 (c)(1),
(2) Date: Mar. 8, 2017

(87) PCT Pub. No.: WO2016/039411
PCT Pub. Date: Mar. 17, 2016

(65) Prior Publication Data
US 2017/0261326 A1    Sep. 14, 2017

(30) Foreign Application Priority Data
Sep. 12, 2014    (JP) .................................. 2014-186768

(51) Int. Cl.
*G01C 21/28* (2006.01)
*G01S 19/47* (2010.01)
*G01C 25/00* (2006.01)

(52) U.S. Cl.
CPC ............. *G01C 21/28* (2013.01); *G01C 25/00* (2013.01); *G01S 19/47* (2013.01); *B60Y 2400/303* (2013.01); *B60Y 2400/3032* (2013.01)

(58) Field of Classification Search
None
See application file for complete search history.

(56) References Cited

U.S. PATENT DOCUMENTS

| 5,383,127 A | * | 1/1995 | Shibata | ............... | G01C 21/30 340/988 |
| 5,796,613 A | * | 8/1998 | Kato | .................. | G01C 21/28 342/457 |

(Continued)

FOREIGN PATENT DOCUMENTS

| JP | 09-119842 A | 5/1997 |
| JP | 2001-510890 A | 8/2001 |

(Continued)

OTHER PUBLICATIONS

Notification of Reasons for Refusal for JP Application No. 2014-186768 dated May 31, 2016.

(Continued)

*Primary Examiner* — Jonathan M Dager
(74) *Attorney, Agent, or Firm* — Sughrue Mion, PLLC

(57) ABSTRACT

A vehicle position detecting device includes an ECU that acquires a wheel speed of a wheel of a vehicle corresponding to rotation of the wheel, detects a skid of the wheel, calculates, when the skid is not detected, a vehicle body speed corresponding to the speed of a vehicle body of the vehicle based on the wheel speed, and corrects, in response (Continued)

to detection of the skid, the wheel speed based on correction information and calculates the vehicle body speed based on the corrected wheel speed. The ECU further calculates the position of the vehicle based on the vehicle body speed depending on the presence of the skid.

5 Claims, 7 Drawing Sheets

(56) References Cited

U.S. PATENT DOCUMENTS

| | | | |
|---|---|---|---|
| 5,898,390 A | 4/1999 | Oshizawa et al. | |
| 5,912,635 A | 6/1999 | Oshizawa et al. | |
| 7,957,881 B2* | 6/2011 | Itoh | B60T 8/175 180/197 |
| 9,764,737 B2* | 9/2017 | Takayama | B60W 30/18 |
| 2005/0055139 A1* | 3/2005 | Tanaka | B62D 15/028 701/1 |
| 2005/0273236 A1* | 12/2005 | Mori | B60T 8/1755 701/41 |
| 2006/0064240 A1* | 3/2006 | Wurth | B60C 23/061 701/32.4 |
| 2009/0326769 A1* | 12/2009 | Oshima | B60K 28/16 701/51 |
| 2011/0184644 A1* | 7/2011 | McBurney | G01C 21/12 701/532 |
| 2012/0188105 A1* | 7/2012 | Alkhalaf | B60R 16/0232 340/989 |
| 2012/0188121 A1* | 7/2012 | Xie | G01S 19/42 342/357.31 |
| 2013/0138318 A1* | 5/2013 | Choby | B60T 8/172 701/84 |
| 2015/0057832 A1* | 2/2015 | Stanek | B60W 40/105 701/1 |

FOREIGN PATENT DOCUMENTS

| | | |
|---|---|---|
| JP | 2005-67566 A | 3/2005 |
| JP | 2006-088828 A | 4/2006 |
| JP | 2007-108139 A | 4/2007 |
| JP | 2009-257892 A | 11/2009 |
| JP | 2010-259292 A | 11/2010 |
| JP | 2013-150448 A | 8/2013 |
| JP | 2014-121138 A | 6/2014 |

OTHER PUBLICATIONS

Notification of Reasons for Refusal for JP Application No. 2014-186768 dated Jan. 5, 2017.
International Search Report for PCT/JP2015/075695 dated Nov. 24, 2015.

* cited by examiner

VEHICLE POSITION DETECTING DEVICE

CROSS-REFERENCE TO RELATED APPLICATIONS

This application is national stage application of International Application No. PCT/JP2015/075695, filed Sep. 10, 2015, which designates the United States, incorporated herein by reference, and which claims the benefit of priority from Japanese Patent Application No. 2014-186768, filed Sep. 12, 2014, the entire contents of which are incorporated herein by reference.

TECHNICAL FIELD

Embodiments of the present invention relate to a vehicle position detecting device.

BACKGROUND ART

Conventionally, there has been known driving assistance devices that perform driving assistance, such as parking assistance, while calculating the position of a vehicle.

CITATION LIST

Patent Literature

Patent Document 1: Japanese Patent Application Laid-open No. 2005-67566
Patent Document 2: Published Japanese Translation of PCT Application No. 2001-510890

SUMMARY OF INVENTION

Problem to be Solved by the Invention

However, the conventional techniques calculate the position of a vehicle based on the wheel speed; therefore, when the wheels skid, the accuracy of the calculated position of the vehicle is reduced, for example.

Means for Solving Problem

A vehicle position detecting device of the embodiment comprises a wheel speed acquisition unit that acquires a wheel speed of a wheel of a vehicle corresponding to rotation of the wheel; a skid detection unit that detects a skid of the wheel; a vehicle body speed calculation unit that calculates, when the skid is not detected by the skid detection unit, a vehicle body speed corresponding to a speed of a vehicle body of the vehicle based on the wheel speed acquired by the wheel speed acquisition unit, and configured to correct, in response to detection of the skid by the skid detection unit, the wheel speed acquired by the wheel speed acquisition unit based on correction information and calculate the vehicle body speed based on the corrected wheel speed; and a position calculation unit that calculates a position of the vehicle based on the vehicle body speed calculated by the vehicle body speed calculation unit depending on presence of the skid. Consequently, even when the wheels skid, for example, the configuration corrects the vehicle body speed to calculate the position of the vehicle, thereby accurately calculating the position of the vehicle.

In the vehicle position detecting device of the embodiment, the correction information is set depending on a straight-traveling state of the vehicle and a turning state of the vehicle. Consequently, when the wheels skid, for example, the configuration corrects the vehicle body speed depending on a straight-traveling state and a turning state to calculate the position of the vehicle, thereby accurately calculating the position of the vehicle.

In the vehicle position detecting device of the embodiment, the correction information is set depending on an accelerating state of the vehicle and a decelerating state of the vehicle. Consequently, when the wheels skid, for example, the configuration corrects the vehicle body speed depending on an accelerating state and a decelerating state to calculate the position of the vehicle, thereby accurately calculating the position of the vehicle.

In the vehicle position detecting device of the embodiment, the skid detection unit detects the skid of the wheel based on a physical quantity relating to rotation of an electric motor serving as a drive source of the wheel. Consequently, even when the relative positional relation between an object and the vehicle is not identified, for example, the configuration can detect a skid of the wheels only by information on the vehicle.

In the vehicle position detecting device of the embodiment, the skid detection unit detects the skid of the wheel based on distance information indicating a distance between an object and the vehicle. Consequently, even when a skid of the wheels is hard to detect only by the information on the vehicle, for example, the configuration can detect a skid of the wheels based on the relative positional relation between the object and the vehicle.

A vehicle position detecting device of the embodiment comprises a first calculation unit that calculates a first position of a vehicle based on a speed of a wheel; a second calculation unit that calculates a second position of the vehicle based on a global positioning system (GPS) signal; and a correction unit that corrects the first position of the vehicle calculated by the first calculation unit based on the second position of the vehicle calculated by the second calculation unit. The configuration corrects the first position of the vehicle calculated by the first calculation unit based on the second position of the vehicle calculated by the second calculation unit, for example. Consequently, even when the wheels skid, the configuration can accurately calculate the position of the vehicle.

BRIEF DESCRIPTION OF DRAWINGS

FIG. 1 is an exemplary perspective view illustrating a state where part of a cabin of a vehicle according to a first embodiment is seen through.

DESCRIPTION OF EMBODIMENTS

Exemplary embodiments and a modification thereof according to the present invention will be disclosed below. Configurations according to the embodiments and the modification described below, and operations, results, and effects achieved by these configurations are merely exemplary. The present invention can achieve any configuration other than the configurations disclosed in the embodiments and the modification below. The present invention can obtain at least one of various kinds of effects (including secondary effects) resulting from the basic configurations.

First Embodiment

Figure 4:
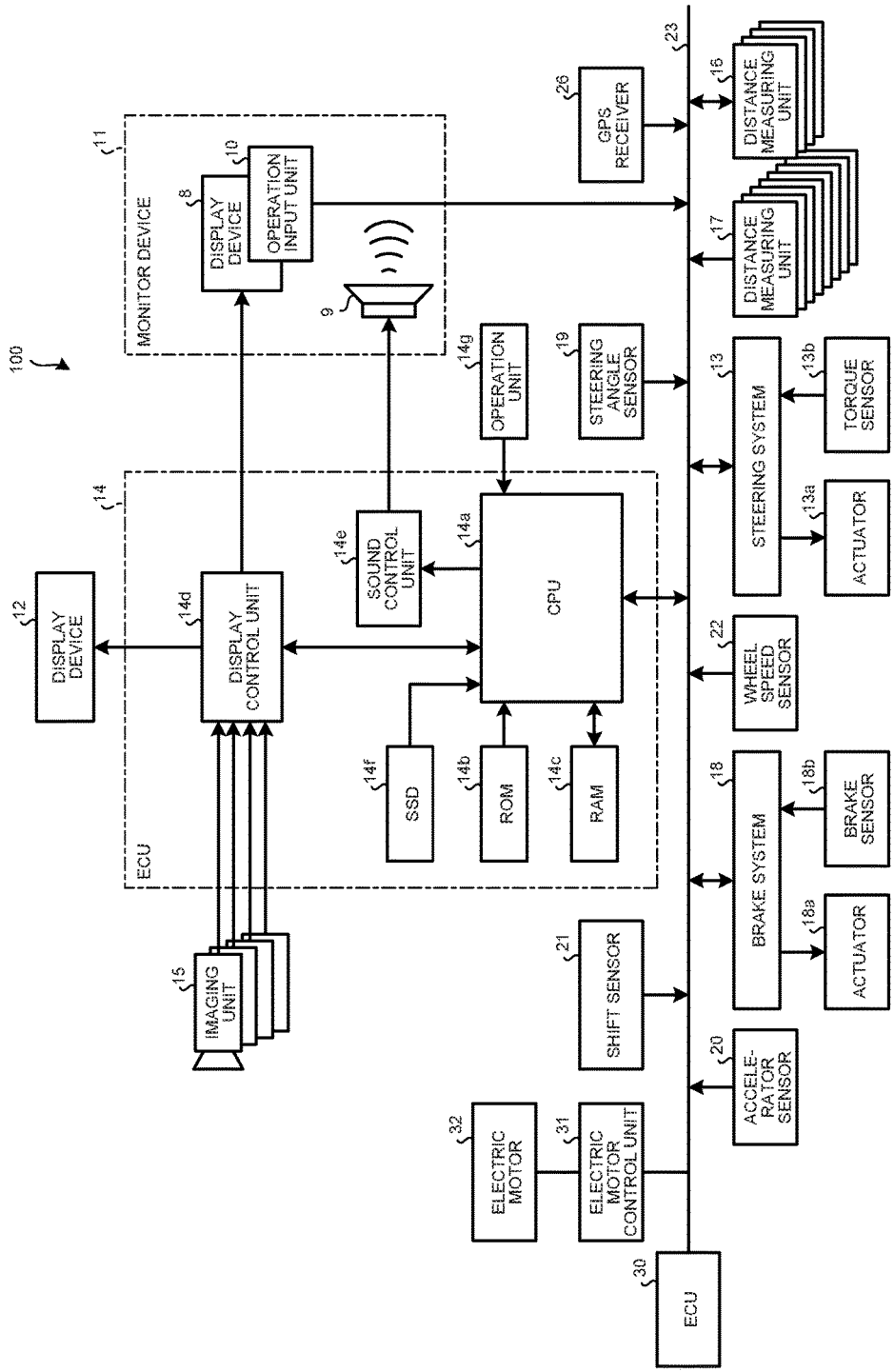
FIG. 4 is an exemplary block diagram of a configuration of a driving assistance system according to the first embodiment.

A vehicle 1 according to a first embodiment may be an automobile having an internal combustion engine (not illustrated) as a drive source, that is, an internal combustion engine automobile, may be an automobile having an electric motor 32 as a drive source, that is, an electric vehicle or a fuel cell electric vehicle, may be a hybrid vehicle having both of the internal combustion engine and the electric motor as drive sources, or may be an automobile having other drive sources, for example. FIG. 4 illustrates an example of a vehicle including the electric motor 32. The vehicle 1 can include a variety of gear shifters, and can include a variety of devices required to drive an internal combustion engine and the electric motor 32, such as systems and components. The style, number, layout, and the like of equipment involved in driving wheels 3 of the vehicle 1 can be set in various ways.

Figure 1:
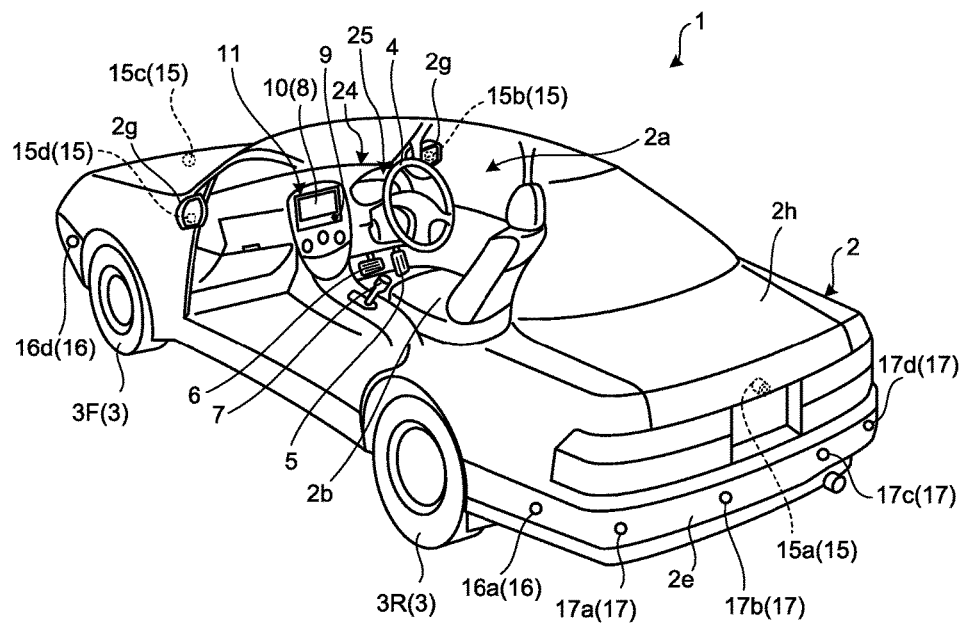

As illustrated in FIG. 1, a vehicle body 2 constitutes a cabin 2a in which an occupant (not illustrated) rides. In the cabin 2a, a steering unit 4, an accelerating operation unit 5, a braking operation unit 6, a gear shift operating unit 7, and the like are provided in a state of facing a seat 2b of a driver as an occupant. The steering unit 4 is a steering wheel protruding from a dash board 24, for example. The accelerating operation unit 5 is an accelerator pedal positioned at the driver's foot, for example. The braking operation unit 6 is a brake pedal positioned at the driver's foot, for example. The gear shift operating unit 7 is a shift lever protruding from a center console, for example. The steering unit 4, the accelerating operation unit 5, the braking operation unit 6, and the gear shift operating unit 7 are not limited to the above.

In the cabin 2a, a display device 8 as a display output unit and a sound output device 9 as a sound output unit are provided. The display device 8 is a liquid crystal display (LCD) or an organic electroluminescent display (OLED), for example. The sound output device 9 is a speaker, for example. The display device 8 is covered by a transparent operation input unit 10 such as a touch panel. An occupant can visually identify an image displayed on a display screen of the display device 8 via the operation input unit 10. The occupant can also perform operation input by performing such an operation as touching, pressing, and moving the operation input unit 10 with a hand, a finger, and the like at a position corresponding to the image displayed on the display screen of the display device 8. The display device 8, the sound output device 9, and the operation input unit 10 are provided in a monitor device 11 positioned in the center in a vehicle width direction, that is, in the right and left direction of the dash board 24, for example. The monitor device 11 can have an operation input unit (not illustrated) such as a switch, a dial, a joystick, and a push button. A sound output device (not illustrated) can be arranged at positions other than the monitor device 11 in the cabin 2a, and the sound output device 9 of the monitor device 11 and another sound output device can output sound. The monitor device 11 can also be used as a navigation system and an audio system, for example.

Figure 3:
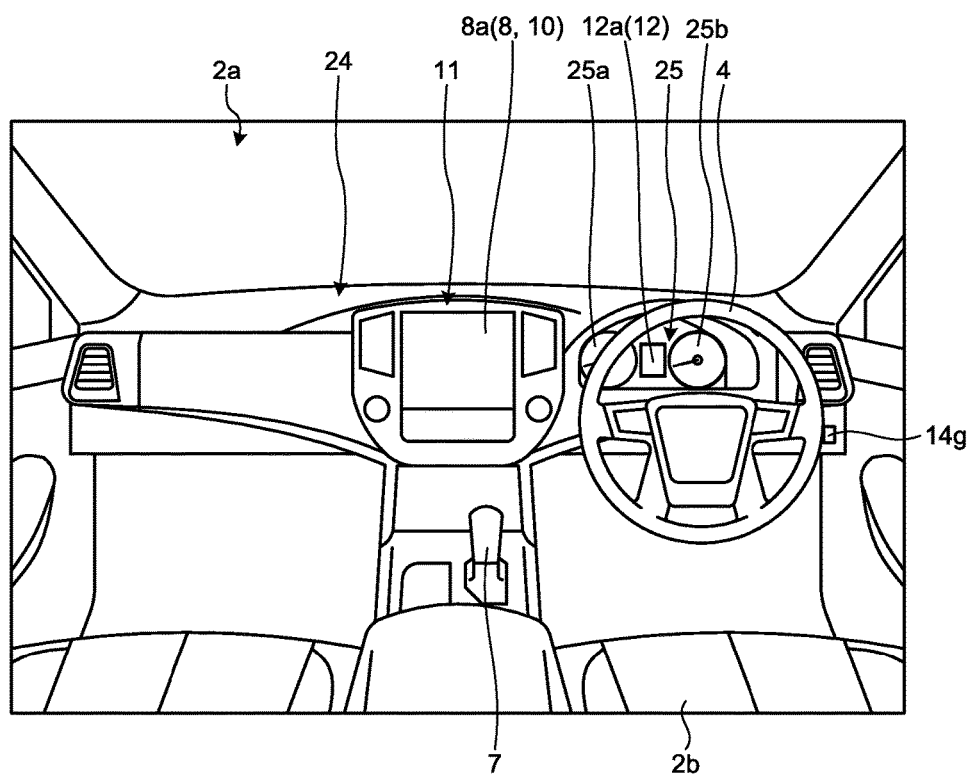
FIG. 3 is a diagram of an example of a dash board of the vehicle according to the first embodiment when viewed from the rear side of the vehicle.

In the cabin 2a, a display device 12 different from the display device 8 is provided. As illustrated in FIG. 3, the display device 12 is arranged on an instrument panel unit 25 of the dash board 24, for example, and is positioned between a speed indicating unit 25a and a revolution indicating unit 25b in the substantially center of the instrument panel unit 25. The size of a screen 12a of the display device 12 is smaller than that of a screen 8a of the display device 8. The display device 12 can primarily display an image indicating information on driving assistance of the vehicle 1. The amount of information displayed on the display device 12 may be smaller than that displayed on the display device 8. The display device 12 is an LCD or an OLED, for example. The display device 8 may display information displayed on the display device 12.

Figure 2:
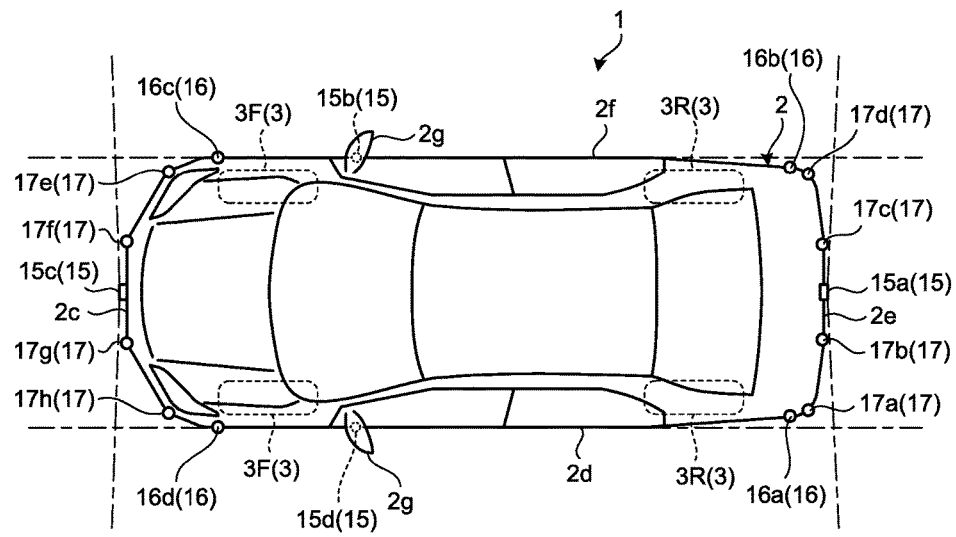
FIG. 2 is an exemplary plan view (bird's-eye view) of the vehicle according to the first embodiment.

As illustrated in FIGS. 1 and 2, the vehicle 1 is a four-wheel automobile and has two right and left front wheels 3F and two right and left rear wheels 3R. All of these four wheels 3 can be configured to be steered. As illustrated in FIG. 4, the vehicle 1 has a steering system 13 configured to steer at least two wheels 3. The steering system 13 has an actuator 13a and a torque sensor 13b. The steering system 13 is electrically controlled by an electronic control unit (ECU) 14 and the like to operate the actuator 13a. The steering system 13 is an electric power steering system or a steer-by-wire (SBW) system, for example. The steering system 13 causes the actuator 13a to add torque or assist torque to the steering unit 4 to assist steering effort or causes the actuator 13a to steer the wheel(s) 3. In this case, the actuator 13a may steer one wheel 3 or a plurality of wheels 3. The torque sensor 13b detects torque given to the steering unit 4 by the driver, for example.

As illustrated in FIG. 2, four imaging units 15a to 15d, for example, are provided as a plurality of imaging units 15 in the vehicle body 2. The imaging units 15 are a digital camera that incorporates an imaging element thereinto, such as a charge coupled device (CCD) and a CMOS image sensor (CIS), for example. The imaging units 15 can output moving image data at a predetermined frame rate. The imaging units 15 each have a wide-angle lens or a fish-eye lens and can photograph the range from 140° to 190°, for example, in the horizontal direction. The optical axis of each of the imaging units 15 is set to be directed obliquely downward. Thus, the imaging units 15 sequentially photograph the external environment surrounding the vehicle body 2 including road surfaces on which the vehicle 1 can travel and areas in which the vehicle 1 can be parked, and output it as captured image data.

The imaging unit 15a is positioned at an end 2e on the rear side of the vehicle body 2 and provided to a wall in the lower portion of a door 2h of a rear trunk, for example. The imaging unit 15b is positioned at an end 2f on the right side of the vehicle body 2 and provided to a door mirror 2g on the right side, for example. The imaging unit 15c is positioned at an end 2c on the front side of the vehicle body 2, that is, on the front side in the fore-and-aft direction of the vehicle and provided to a front bumper, for example. The imaging unit 15d is positioned at an end 2d on the left side of the vehicle body 2, that is, on the left side in the vehicle width direction and provided to a door mirror 2g serving as a protruding part on the left side, for example. The ECU 14 can perform arithmetic processing and image processing based on image data obtained by the imaging units 15 to generate an image having a wider angle of visibility and generate a virtual bird's-eye view image when the vehicle 1 is viewed from above. The bird's-eye view image may also be referred to as a plane image.

The ECU 14 also identifies a division line and the like designated on road surfaces around the vehicle 1 from images obtained by the imaging units 15, and detects (extracts) a parking section designated by the division line and the like.

As illustrated in FIGS. 1 and 2, four distance measuring units 16a to 16d and eight distance measuring units 17a to 17h, for example, are provided as a plurality of distance measuring units 16 and 17 in the vehicle body 2. Each of the distance measuring units 16 and 17 is a sonar that emits ultrasound and captures its reflected wave, for example. The sonar can also be referred to as a sonar sensor or an ultrasonic detector. The ECU 14 can measure whether any object such as an obstacle is located around the vehicle 1 and the distance to the object, based on detection results from the distance measuring units 16 and 17. Specifically, the distance measuring units 16 and 17 are examples of a detection unit configured to detect objects. The distance measuring units 17 can be used to detect objects at a relatively short distance, for example, while the distance measuring units 16 can be used to detect objects at a relatively long distance that is farther than the objects the distance measuring units 17 detect, for example. The distance measuring units 17 can be used to detect objects ahead of and behind the vehicle 1, while the distance measuring units 16 can be used to detect objects at the lateral sides of the vehicle 1, for example.

As illustrated in FIG. 4, in a driving assistance system 100, a brake system 18, a steering angle sensor 19, an accelerator sensor 20, a shift sensor 21, a wheel speed sensor 22, a global positioning system (GPS) receiver 26, and the like are electrically connected via an in-vehicle network 23 as an electric telecommunication line, in addition to the ECU 14, the monitor device 11, the steering system 13, and the distance measuring units 16 and 17. The in-vehicle network 23 is configured as a controller area network (CAN), for example. The ECU 14 can control the steering system 13, the brake system 18, and the like by transmitting control signals thereto via the in-vehicle network 23. The ECU 14 can also receive detection results from the torque sensor 13b, a brake sensor 18b, the steering angle sensor 19, the distance measuring units 16, the distance measuring units 17, the accelerator sensor 20, the shift sensor 21, the wheel speed sensor 22, and the like and operation signals from the operation input unit 10 and the like via the in-vehicle network 23.

The ECU 14 has a central processing unit (CPU) 14a, a read only memory (ROM) 14b, a random access memory (RAM) 14c, a display control unit 14d, a sound control unit 14e, and a solid state drive (SSD, flash memory) 14f, for example. The CPU 14a can perform a variety of arithmetic processing and control, such as image processing concerned with images displayed on the display devices 8 and 12, determination of a travel target position of the vehicle 1, arithmetic processing of a travel route of the vehicle 1, judgment as to whether interference with an object is present, automatic control of the vehicle 1, and cancellation of automatic control. The CPU 14a can read a computer program installed and stored in a nonvolatile memory such as the ROM 14b, and perform arithmetic processing in accordance with the computer program. The RAM 14c temporarily stores therein various types of data to be used for arithmetic processing performed by the CPU 14a. The display control unit 14d primarily performs image processing that uses the image data obtained by the imaging units 15 and composition of image data displayed on the display device 8, out of the arithmetic processing performed by the ECU 14. The sound control unit 14e primarily processes sound data output by the sound output device 9, out of the arithmetic processing performed by the ECU 14. The SSD 14f is a rewritable nonvolatile memory and can store therein data even when the power of the ECU 14 is turned off. The CPU 14a, the ROM 14b, the RAM 14c, and the like can be integrated in the same package. The ECU 14 may have a configuration in which other logical operation processor or logic circuit such as a digital signal processor (DSP) is used instead of the CPU 14a. A hard disk drive (HDD) may be provided instead of the SSD 14f, and the SSD 14f and the HDD may be provided separately from the ECU 14.

The brake system 18 is an anti-lock brake system (ABS) that prevents locking of the brake, electronic stability control (ESC) that prevents a skid of the vehicle 1 during cornering, an electric brake system that increases braking force (performs brake assist), or brake by wire (BBW), for example. The brake system 18 applies braking force to the wheels 3 and eventually to the vehicle 1 via an actuator 18a. The brake system 18 can perform a variety of control by detecting locking of the brake, idling of the wheels 3, and a sign of a skid based on the rotational difference between the right and left wheels 3. The brake sensor 18b is a sensor configured to detect the position of a movable part of the braking operation unit 6, for example. The brake sensor 18b can detect the position of a brake pedal serving as the movable part. The brake sensor 18b includes a displacement sensor.

The steering angle sensor 19 is a sensor configured to detect the steering amount of the steering unit 4 such as a steering wheel, for example. The steering angle sensor 19 is configured by using a Hall element, for example. The ECU 14 acquires the steering amount of the steering unit 4 by the driver, the steering amount of each wheel 3 during automatic steering, and the like from the steering angle sensor 19 to perform a variety of control. The steering angle sensor 19 detects the turning angle of a turning part included in the steering unit 4. The steering angle sensor 19 is an example of an angle sensor.

The accelerator sensor 20 is a sensor configured to detect the position of a movable part of the accelerating operation unit 5, for example. The accelerator sensor 20 can detect the position of an accelerator pedal serving as the movable part. The accelerator sensor 20 includes a displacement sensor.

The shift sensor 21 is a sensor configured to detect the position of a movable part of the gear shift operation unit 7, for example. The shift sensor 21 can detect the position of a lever, an arm, a button, and the like serving as the movable part. The shift sensor 21 may include a displacement sensor or may be configured as a switch.

The wheel speed sensor 22 is a sensor configured to detect the rotation amount and the rotation speed per unit time of the wheels 3. The wheel speed sensor 22 outputs a wheel speed pulse number indicating the detected rotation speed as a sensor value. The wheel speed sensor 22 is configured by using a Hall element, for example. The ECU 14 calculates the travel amount and the like of the vehicle 1 based on the sensor value acquired from the wheel speed sensor 22 to perform a variety of control. The wheel speed sensor 22 may be provided in the brake system 18. In this case, the ECU 14 acquires the detection result of the wheel speed sensor 22 via the brake system 18. The ECU 14 can calculate the wheel speed based on the sensor value acquired from the wheel speed sensor 22. In this case, the ECU 14 may use the sensor value of one wheel speed sensor 22 or the sensor values of a plurality of wheel speed sensors 22.

An ECU 30, an electric motor control unit 31, and other components are connected to the in-vehicle network 23. The ECU 30 controls an electric motor system including an electric motor 32. The electric motor control unit 31 controls the electric motor 32 and monitors the electric motor. The electric motor control unit 31 includes an electric motor ECU, an inverter, a PWM control unit, a torque detection unit, an electric current detection unit, and a rotation speed detection unit, for example. The electric motor control unit 31 controls rotation of the electric motor 32 based on a torque command issued from the ECU 30. In the present embodiment, a target electric current flowing through the electric motor 32 and a target rotation speed of the electric motor 32 set based on target torque in the torque command are stored in a storage unit (not illustrated) as electric motor drive information. The storage unit may be provided in the electric motor control unit 31, for example. The electric motor control unit 31 detects torque actually generated by the electric motor 32, an electric current actually flowing through the electric motor 32, and an actual rotation speed of the electric motor 32. The electric motor control unit 31 outputs the detected torque, the detected electric current, the detected rotation speed, and the electric motor drive information to the ECU 14 as electric motor rotation information.

The configurations, arrangements, and electrical connections of various sensors and actuators described above are merely examples, and can be set (changed) in various ways.

Figure 5:
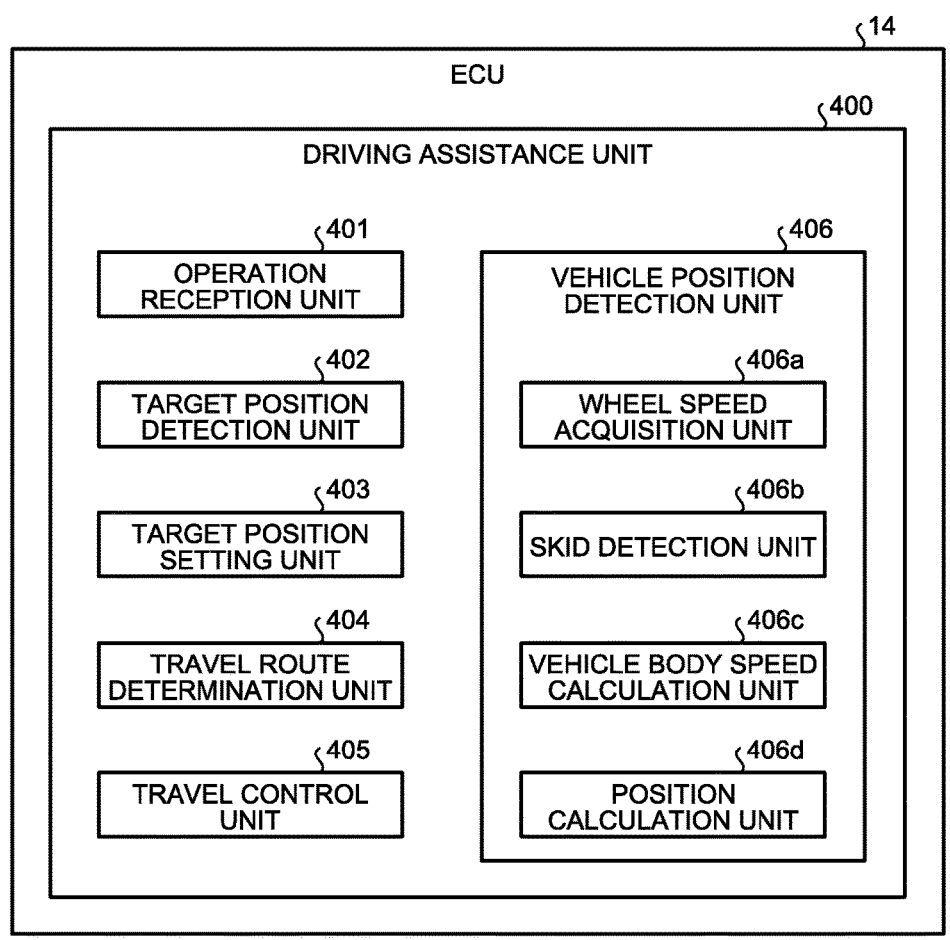
FIG. 5 is an exemplary block diagram of a configuration of an ECU of the driving assistance system according to the first embodiment.

The following describes a configuration of a driving assistance unit 400 provided in the ECU 14. As illustrated in FIG. 5, the driving assistance unit 400 includes an operation reception unit 401, a target position detection unit 402, a target position setting unit 403, a travel route determination unit 404, a travel control unit 405, and a vehicle position detection unit 406.

The components in the driving assistance unit 400 illustrated in FIG. 5 are provided by the CPU 14a in the ECU 14 illustrated in FIG. 4 executing a computer program stored in the ROM 14b. In other words, by executing the computer program stored in the ROM 14b, the operation reception unit 401, the target position detection unit 402, the vehicle position detection unit 406, the target position setting unit 403, the travel route determination unit 404, and the travel control unit 405 are provided in the driving assistance unit 400. These units may be provided as hardware.

Figure 6:
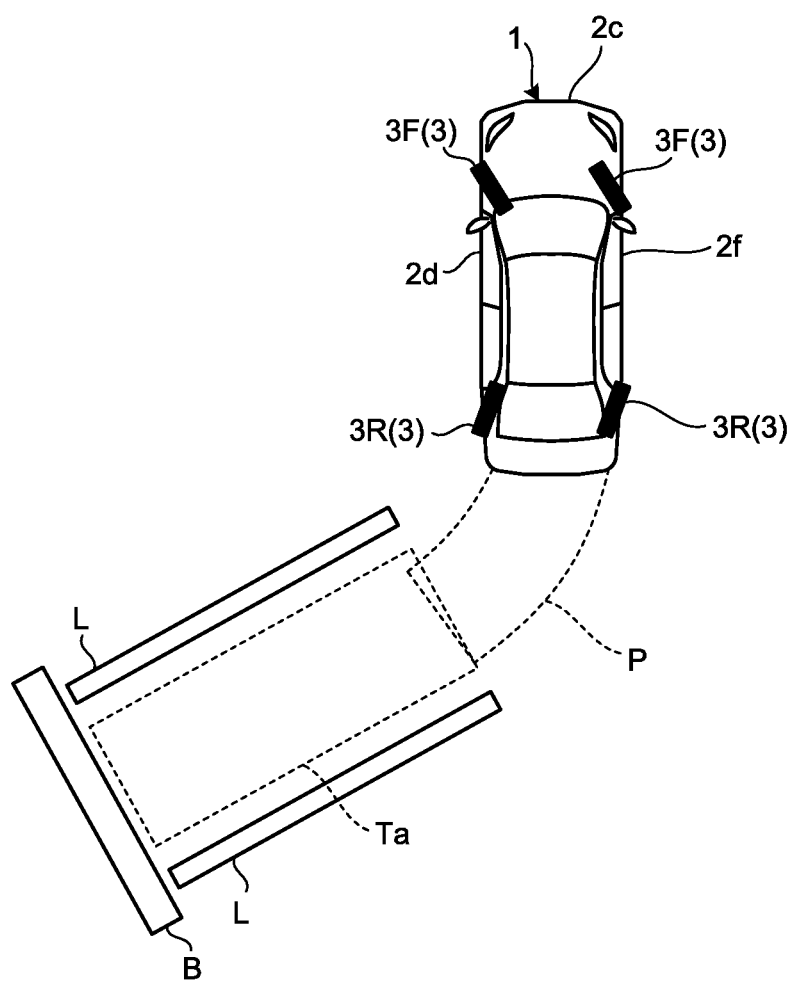
FIG. 6 is an exemplary plan view (bird's-eye view) illustrating a target position and a travel route of the vehicle according to the first embodiment.

The driving assistance unit 400 can perform parking assistance, for example. To park the vehicle 1, the driving assistance unit 400 detects a target position Ta indicating the position coordinates of an area in which the vehicle 1 can be parked as illustrated in FIG. 6, for example. The driving assistance unit 400 can determine a travel route P of the vehicle 1 from the current position to the target position Ta and control the vehicle 1 such that the vehicle 1 travels along the travel route P.

The operation reception unit 401 receives instruction signals (control signals) from the operation input unit 10, an operation unit 14g, and the like. Based on the instruction signals, the operation reception unit 401 can receive an operation from the driver. The operation unit 14g is a push button or a switch, for example.

The target position detection unit 402, for example, sequentially detects the target position Ta every predetermined time. Specifically, the target position detection unit 402 according to the present embodiment, for example, performs edge extraction on captured image data obtained in a backward-traveling process, a forward-traveling process, and a stop state of the vehicle 1 output from the imaging units 15. As a result, the target position detection unit 402 detects parking division lines, such as a pair of white lines L (FIG. 6) provided on a road surface. The target position detection unit 402 thus can detect an area surrounded by the pair of parking division lines as an area in which the vehicle 1 can be parked, that is, a parking target position. The method for calculating the parking target position is not limited to the method described above.

The target position setting unit 403 sets a target position Ta to be a final parking target out of the target positions Ta sequentially detected by the target position detection unit 402. The target position setting unit 403, for example, receives specification of a parking frame image from the driver out of parking frame images sequentially displayed in a parking target on a bird's-eye view image displayed on the display device 8. The target position setting unit 403 can set the position of the specified parking frame image as the final target position. Alternatively, when the steering angle sensor 19 detects that the driver has started a parking operation toward the position indicated by the parking frame image, for example, the target position setting unit 403 can set the position of the parking frame image as the final target position. The method for setting the target position Ta is not limited to the methods described above.

The travel route determination unit 404 calculates a travel route of the vehicle 1 from the current position to the target position Ta. The travel route determination unit 404 can calculate a travel route of the vehicle 1 by performing geometrical arithmetic operations according to a predetermined procedure and conditions based on the current position and the target position Ta of the vehicle 1. Alternatively, the travel route determination unit 404 can refer to data on a plurality of route patterns stored in the ROM 14b or the SSD 14f, for example, to select a route pattern corresponding to the current position and the target position Ta. The method for calculating the travel route is not limited to the methods described above.

The travel control unit 405 steers the wheels 3 in traveling of the vehicle 1 along the travel route determined by the travel route determination unit 404. Specifically, the travel control unit 405 controls the actuator 13a of the steering system 13 depending on the position of the vehicle 1 such that the vehicle 1 travels along the travel route determined by the travel route determination unit 404. At this time, the position of the vehicle 1 is detected by the vehicle position detection unit 406. The vehicle 1 according to the present embodiment is accelerated or decelerated (braked) depending on an operation performed by the driver on the accelerating operation unit 5 or the braking operation unit 6. The method for travel control is not limited to the method described above.

The vehicle position detection unit 406 detects the position of the vehicle 1 every predetermined time. As illustrated in FIG. 5, the vehicle position detection unit 406 includes a wheel speed acquisition unit 406a, a skid detection unit 406b, a vehicle body speed calculation unit 406c, and a position calculation unit 406d.

The wheel speed acquisition unit 406a acquires the wheel speed of the wheels 3 corresponding to the rotation of the wheels 3 of the vehicle 1 every predetermined time. The wheel speed is the circumferential speed of the wheels 3. The wheel speed acquisition unit 406a calculates the wheel speed (circumferential speed) based on the rotation speed per unit time of the wheels 3 detected by the wheel speed sensor 22, that is, the rotation speed of the wheels 3 and on the diameter of the wheels 3. At this time, the wheel speed acquisition unit 406a may use the rotation speed of one of the four wheels 3 or the average of the rotation speeds of a plurality of wheels 3. The method for acquiring the wheel speed is not limited to the method described above.

The skid detection unit 406b detects a skid of the wheels 3 every predetermined time. The skid includes a spin of the wheels 3 and a lock of the wheels 3. The skid detection unit 406b can detect a skid of the wheels 3 based on the physical quantity relating to the rotation of the electric motor 32 serving as the drive source of the wheels 3. The physical quantity relating to the rotation of the electric motor 32 is the torque generated by the electric motor 32, the electric current flowing through the electric motor 32, and the rotation speed of the electric motor 32, for example. When the wheels 3 skid, a difference occurs between the target torque of the electric motor 32, the target electric current of the electric motor 32, and the target rotation speed of the electric motor 32 based on the torque command issued from the ECU 30 and actual torque corresponding to the torque actually generated by the electric motor 32, an actual electric current corresponding to the electric current actually flowing through the electric motor 32, and an actual rotation speed corresponding to the actual rotation speed of the electric motor 32, respectively. The skid detection unit 406b according to the present embodiment calculates at least one of the amount of difference between the target torque and the actual torque, the amount of difference between the target electric current and the actual electric current, and the amount of difference between the target rotation speed and the actual rotation speed. If the amount of difference is larger than a predetermined threshold, the skid detection unit 406b determines that the wheels 3 skid. To make such determination, the skid detection unit 406b uses the electric motor rotation information output from the electric motor control unit 31.

The vehicle body speed calculation unit 406c detects the vehicle body speed every predetermined time. Specifically, if no skid of the wheels 3 is detected by the skid detection unit 406b, the vehicle body speed calculation unit 406c calculates the vehicle body speed based on the wheel speed acquired by the wheel speed acquisition unit 406a. Specifically, the vehicle body speed calculation unit 406c derives the wheel speed by considering that the vehicle body speed is equal to the wheel speed (circumferential speed).

By contrast, when a skid of the wheels 3 is detected by the skid detection unit 406b, the accuracy of the derived vehicle body speed is reduced if the vehicle body speed is assumed to be equal to the wheel speed (circumferential speed). To address this, if a skid of the wheels 3 is detected by the skid detection unit 406b, the vehicle body speed calculation unit 406c according to the present embodiment corrects the wheel speed acquired by the wheel speed acquisition unit 406a and calculates the vehicle body speed based on the corrected wheel speed. Specifically, the vehicle body speed calculation unit 406c uses a skid rate defined by Expression (1): Skid Rate=(Vehicle Body Speed−Wheel Speed)/Vehicle Body Speed. The skid rate corresponds to correction information. Expression (1) derives Expression (2):

$$\text{Vehicle Body Speed} = \text{Wheel Speed}/(1-\text{Skid Rate}) \quad (2)$$

In other words, if a skid of the wheels 3 occurs, and the skid rate is identified, the vehicle body speed calculation unit 406c can correct the wheel speed using the skid rate. As a result, the vehicle body speed calculation unit 406c can accurately calculate the vehicle body speed even when the wheels 3 skid. The skid rate according to the present embodiment is stored in the ROM 14b in advance. If a skid of the wheels 3 is detected by the skid detection unit 406b, the vehicle body speed calculation unit 406c calculates the vehicle body speed using the skid rate stored in the ROM 14b and Expression (2). In other words, the vehicle body speed calculation unit 406c corrects the wheel speed based on skid information and calculates the vehicle body speed based on the corrected wheel speed. As is clear from the description above, the wheel speed obtained when a skid occurs is equal to the corrected vehicle body speed (circumferential speed) in the present embodiment. The storage unit that stores therein the skid rate may also be a unit other than the ROM 14b.

The skid rate according to the present embodiment is set depending on the running state of the vehicle 1. The skid rate is set depending on a straight-traveling state of the vehicle 1, a turning state of the vehicle 1, an accelerating state of the vehicle 1, and a decelerating state of the vehicle 1, for example. The skid rate can be set depending on a combination that can be combined out of the straight-traveling state, the turning state, the accelerating state, and the decelerating state.

The vehicle body speed calculation unit 406c uses the skid rate corresponding to the running state of the vehicle 1 to correct the wheel speed. The vehicle body speed calculation unit 406c can detect the running state of the vehicle 1 by various methods. The vehicle body speed calculation unit 406c can detect a change over time in the positional relation between an object B and the vehicle 1 from the captured data obtained by the imaging units 15 and the detection results of the distance measuring units 16 and 17, for example. Based on the detection result, the vehicle body speed calculation unit 406c can determine whether the vehicle 1 is in the straight-traveling state or the turning state. The vehicle body speed calculation unit 406c can also determine whether the vehicle 1 is in the straight-traveling state or the turning state based on the detection result of the steering angle sensor 19, for example. The vehicle body speed calculation unit 406c can also determine whether the vehicle 1 is in the straight-traveling state or the turning state based on the wheel speed of the wheels 3 on the right side acquired by the wheel speed acquisition unit 406a and the wheel speed of the wheels 3 on the left side acquired by the wheel speed acquisition unit 406a. If the difference between the wheel speed of the wheels 3 on the right side and the wheel speed of the wheels 3 on the left side is equal to or larger than a predetermined amount, for example, the vehicle body speed calculation unit 406c determines that the vehicle 1 is in the turning state. If the difference between the wheel speed of the wheels 3 on the right side and the wheel speed of the wheels 3 on the left side is smaller than the predetermined amount, the vehicle body speed calculation unit 406c determines that the vehicle 1 is in the straight-traveling state. The vehicle body speed calculation unit 406c can determine whether the vehicle 1 is in the accelerating state or the decelerating state based on the wheel speed acquired by the wheel speed acquisition unit 406a, for example. When determining the running state using the wheel speed, the vehicle body speed calculation unit 406c can use the wheel speed acquired by the wheel speed acquisition unit 406a before a skid of the wheels 3 is detected by the skid detection unit 406b. The vehicle body speed calculation unit 406c can also determine whether the vehicle 1 is in the accelerating state or the decelerating state based on the detection result of an acceleration sensor (not illustrated) provided in the vehicle body 2, for example. The skid detection unit 406b can determine whether the vehicle 1 is in the straight-traveling state, the turning state, the accelerating state, or the decelerating state based on the detection result of the GPS receiver 26, for example.

The position calculation unit 406d calculates the position of the vehicle 1 every predetermined time based on the vehicle body speed calculated by the vehicle body speed calculation unit 406c depending on whether a skid of the wheels 3 has occurred. The calculated position of the vehicle 1 is expressed by a two-dimensional coordinate system, for example. The position calculation unit 406d can calculate the relative position and the relative attitude (deviation angle) of the vehicle 1 at the end of the predetermined time with respect to the position and the attitude of the vehicle 1 at the start of the predetermined time based on the travel amount of the vehicle 1 at the vehicle body speed during the predetermined time calculated by the vehicle body speed calculation unit 406c and on the steering angle of the wheels 3 output from the steering angle sensor 19, for example. For this calculation, the position calculation unit 406d can use the curvature in the turning of the vehicle 1 calculated from the steering angle of the wheels 3. The position calculation unit 406d repeats the processing described above every predetermined time from when the vehicle 1 is positioned at a reference position, thereby calculating the relative position and the relative attitude of the vehicle 1 with respect to the reference position. The reference position is the position of the vehicle 1 at the start of driving assistance, for example.

Figure 7:
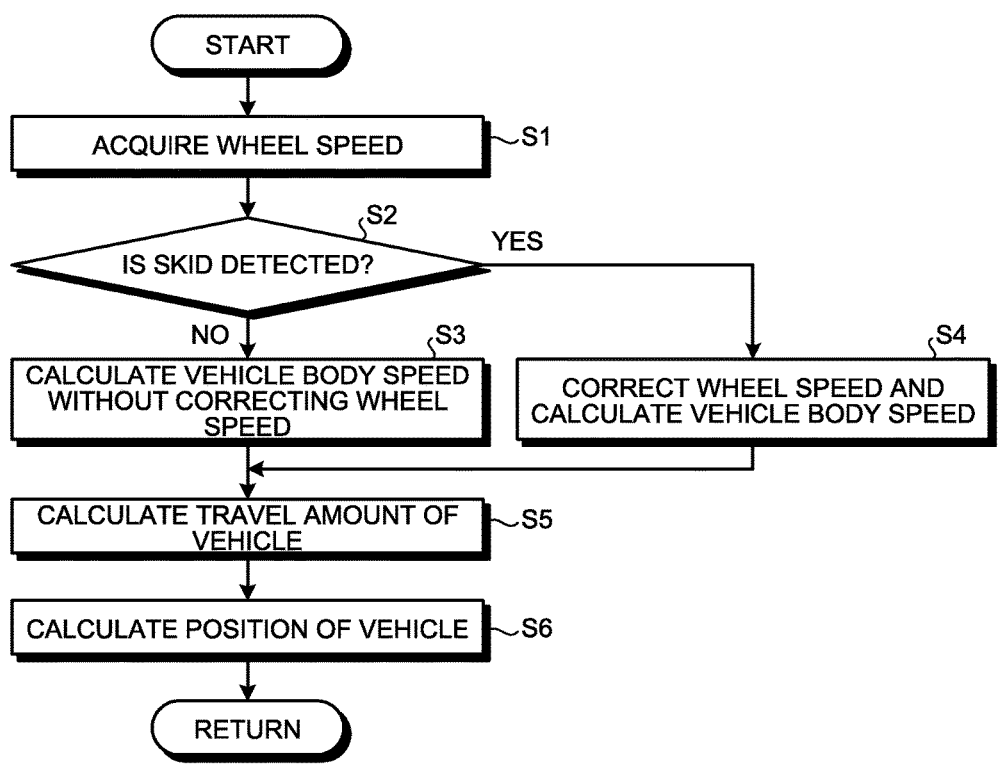
FIG. 7 is an exemplary flowchart illustrating a procedure of vehicle position detection processing according to the first embodiment.

The following describes the procedure of vehicle position detection processing performed by the vehicle position detection unit 406 having the configuration described above with reference to FIG. 7. The wheel speed acquisition unit 406a acquires the wheel speed (S1), and the skid detection unit 406b detects a skid of the wheels 3 (S2).

If no skid of the wheels 3 is detected (No at S2), the vehicle body speed calculation unit 406c calculates the vehicle body speed based on the acquired wheel speed (S3). By contrast, if a skid of the wheels 3 is detected (Yes at S2), the vehicle body speed calculation unit 406c corrects the acquired wheel speed based on the skid rate stored in the ROM 14b and calculates the vehicle body speed based on the corrected wheel speed (S4). Subsequently, the position calculation unit 406d calculates the travel amount of the vehicle 1 based on the vehicle body speed calculated by the vehicle body speed calculation unit 406c depending on whether a skid of the wheels 3 has occurred (S5). The position calculation unit 406d calculates the position and the attitude of the vehicle 1 based on the travel amount (S6). The processing described above is repeated every predetermined time.

As described above, when a skid is detected, the vehicle body speed calculation unit 406c according to the present embodiment corrects the acquired wheel speed based on the skid rate and calculates the vehicle body speed based on the corrected wheel speed. The position calculation unit 406d calculates the position of the vehicle 1 based on the corrected wheel speed. Consequently, even when the wheels 3 skid, for example, the configuration corrects the vehicle body speed to calculate the position of the vehicle 1, thereby accurately calculating, that is, detecting the position and the attitude of the vehicle 1.

In a case where the position of the vehicle 1 is detected by the GPS receiver 26, for example, if the vehicle 1 is positioned outside the operation range of the GPS receiver 26, the position of the vehicle 1 cannot be identified. By contrast, the present embodiment calculates the position of the vehicle 1 based on the wheel speed of the vehicle 1. Consequently, the present embodiment can calculate the position of the vehicle 1 independently of the position of the vehicle 1.

The skid rate according to the present embodiment is set depending on the straight-traveling state of the vehicle 1 and the turning state of the vehicle 1. Consequently, when the wheels 3 skid, for example, the configuration corrects the vehicle body speed depending on the straight-traveling state and the turning state to calculate the position of the vehicle, thereby accurately calculating the position of the vehicle 1.

The skid rate according to the present embodiment is set depending on the accelerating state of the vehicle 1 and the decelerating state of the vehicle 1. Consequently, when the wheels 3 skid, for example, the configuration corrects the vehicle body speed depending on the accelerating state and the decelerating state to calculate the position of the vehicle 1, thereby accurately calculating the position of the vehicle 1.

The skid detection unit 406b according to the present embodiment detects a skid of the wheels 3 based on the physical quantity relating to the rotation of the electric motor 32. Consequently, even when the relative positional relation between the object B and the vehicle 1 is not identified, for example, the configuration can detect a skid of the wheels 3 only by information on the vehicle 1.

Modifications

The following describes a modification of the embodiment above. The present modification is different from the embodiment above mainly in the method for detecting a skid and the method for acquiring the skid rate performed by the skid detection unit 406b. The skid detection unit 406b according to the present modification can detect a skid of the wheels 3 based on distance information indicating the distance between the object B (FIG. 6) and the vehicle 1. In this case, the skid detection unit 406b calculates the travel amount by which the vehicle 1 actually travels during a predetermined time based on the detection results of the distance measuring units 16 and 17 corresponding to the distance information. Specifically, the skid detection unit 406b calculates the travel amount by which the vehicle 1 has actually traveled based on the amount of change in the distance to the object B measured by the distance measuring units 16 and 17 in the predetermined time. The skid detection unit 406b also calculates a theoretical travel amount of the vehicle 1 based on the wheel speed acquired by the wheel speed acquisition unit 406a. Specifically, the skid detection unit 406b calculates the theoretical travel amount of the vehicle 1 assuming that the vehicle body speed is equal to the wheel speed (circumferential speed) and that the vehicle 1 travels at the vehicle body speed during the predetermined time. If a predetermined difference is present between the actual travel amount and the theoretical travel amount of the vehicle 1, the skid detection unit 406b determines that the wheels 3 skid. The distance information indicating the distance between the object B and the vehicle 1 may be acquired based on the image captured by the imaging units 15.

If the predetermined difference is present between the actual travel amount and the theoretical travel amount of the vehicle 1, the skid detection unit 406b according to the present modification calculates the skid rate based on the difference between the actual travel amount and the theoretical travel amount of the vehicle 1. The skid rate can be calculated based on the ratio of the actual travel amount of the vehicle 1 to the theoretical travel amount of the vehicle 1, for example. Consequently, the skid detection unit 406b can calculate the skid rate depending on actual road surface conditions and other factors.

The present modification, for example, can use a skid rate calculated in detection of a first skid to correct the wheel speed in detection of the first skid and skids subsequent thereto. By using the corrected wheel speed, the present modification can calculate the travel amount of the vehicle 1 and the position of the vehicle 1. Because such a modification needs not calculate the skid rate in detection of the subsequent skids, the processing time can be readily reduced. If the running state of the vehicle 1 in detection of the subsequent skids is different from the running state of the vehicle 1 in detection of the first skid, the present modification may calculate another skid rate and correct the wheel speed using the skid rate. In other words, the present modification may calculate the skid rate for each running condition of the vehicle 1.

As described above, the skid detection unit 406b according to the present modification detects a skid of the wheels 3 based on the distance information indicating the distance between the object B and the vehicle 1. Consequently, even when a skid of the wheels 3 is hard to detect only by the information on the vehicle 1 in a case where the electric motor 32 is not used as the drive source, for example, the configuration can detect a skid of the wheels 3 based on the relative positional relation between the object B and the vehicle 1.

Second Embodiment

Figure 8:
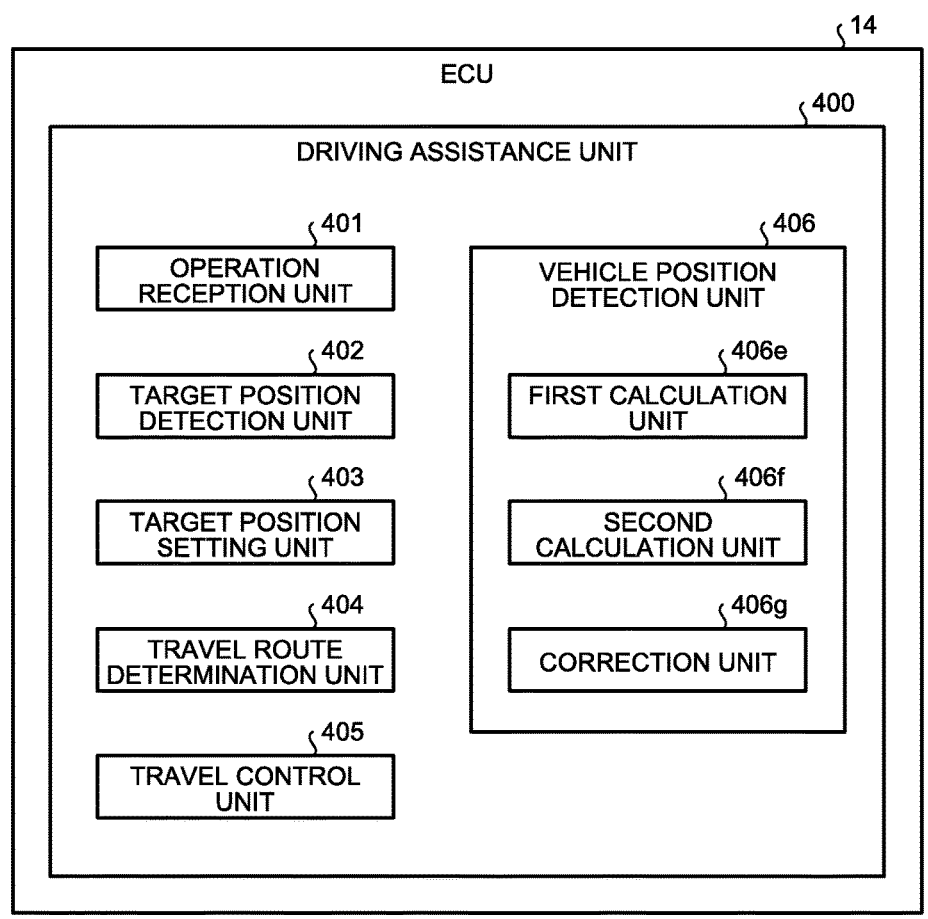
FIG. 8 is an exemplary block diagram of a configuration of the ECU of the driving assistance system according to a second embodiment.

The following describes a second embodiment. As illustrated in FIG. 8, the present embodiment is different from the first embodiment in the vehicle position detection unit 406 of the driving assistance unit 400. The vehicle position detection unit 406 according to the present embodiment includes a first calculation unit 406e, a second calculation unit 406f, and a correction unit 406g.

The first calculation unit 406e calculates a first position of the vehicle 1 based on the speed of the wheels 3. Specifically, the first calculation unit 406e calculates the vehicle body speed by the same method as the method for calculating the vehicle body speed performed by the vehicle body speed calculation unit 406c (FIG. 5) when the wheels 3 do not skid. Similarly to the position calculation unit 406d (FIG. 5), the first calculation unit 406e uses the calculated vehicle body speed to calculate the first position of the vehicle 1.

The second calculation unit 406f calculates a second position of the vehicle 1 based on GPS signals received from a GPS satellite by the GPS receiver 26.

The correction unit 406g corrects the first position of the vehicle 1 calculated by the first calculation unit 406e based on the second position of the vehicle 1 calculated by the second calculation unit 406f. If a difference is present between the first position of the vehicle 1 calculated by the first calculation unit 406e and the second position of the vehicle 1 calculated by the second calculation unit 406f, for example, the correction unit 406g changes the first position of the vehicle 1 calculated by the first calculation unit 406e to the second position of the vehicle 1 calculated by the second calculation unit 406f. The difference between the first position of the vehicle 1 calculated by the first calculation unit 406e and the second position of the vehicle 1 calculated by the second calculation unit 406f is generated by a skid of the wheels 3, for example.

As described above, the correction unit 406g according to the present embodiment corrects the first position of the vehicle 1 calculated by the first calculation unit 406e based on the second position of the vehicle 1 calculated by the second calculation unit 406f. Consequently, even when the wheels 3 skid, the present embodiment can accurately calculate the position of the vehicle 1.

The computer program executed by the driving assistance unit 400 according to the embodiments above and the modification thereof may be recorded and provided in a computer-readable recording medium, such as a CD-ROM, a flexible disk (FD), a CD-R, and a digital versatile disc (DVD), as an installable or executable file.

The computer program executed by the driving assistance unit 400 according to the embodiments above and the modification thereof may be stored in a computer connected to a network, such as the Internet, and provided by being downloaded via the network. Furthermore, the computer program executed by the driving assistance unit 400 according to the embodiments may be provided or distributed via a network, such as the Internet.

While certain embodiments and a modification thereof according to the present invention have been described, they are presented by way of example only and are not intended to limit the scope of the invention. The embodiments and the modification may be embodied in a variety of other forms, and various omissions, substitutions, combinations, and changes may be made without departing from the spirit of the invention. The specifications including the configuration and the shape (e.g., the structure, the type, the direction, the shape, the size, the length, the width, the thickness, the height, the number, the arrangement, the position, and the material) may be appropriately changed.

EXPLANATIONS OF LETTERS OR NUMERALS 1 vehicle
2 vehicle body
3 wheel
14b ROM
32 electric motor
400 driving assistance unit
406 vehicle position detection unit
406a wheel speed acquisition unit
406b skid detection unit
406c vehicle body speed calculation unit
406d position calculation unit
406e first calculation unit
406f second calculation unit
406g correction unit

The invention claimed is:

1. A vehicle position detecting device comprising:
an ECU configured to:
acquire a wheel speed of a wheel of a vehicle corresponding to rotation of the wheel;
detect a skid of the wheel;
calculate, when the skid is not detected by the ECU, a vehicle body speed corresponding to a speed of a vehicle body of the vehicle based on the wheel speed, and configured to correct, in response to detection of the skid, the wheel speed based on correction information and calculate the vehicle body speed based on the corrected wheel speed; and
calculate a position of the vehicle based on the vehicle body speed depending on presence of the skid.

2. The vehicle position detecting device according to claim 1, wherein the correction information is set depending on a straight-traveling state of the vehicle and a turning state of the vehicle.

3. The vehicle position detecting device according to claim 1, wherein the correction information is set depending on an accelerating state of the vehicle and a decelerating state of the vehicle.

4. The vehicle position detecting device according to claim 1, wherein the ECU is configured to detect the skid of the wheel based on a physical quantity relating to rotation of an electric motor serving as a drive source of the wheel.

5. The vehicle position detecting device according to claim 1, wherein the ECU is configured to detect the skid of the wheel based on distance information indicating a distance between an object and the vehicle.

\* \* \* \* \*